United States Patent [19]

O'Neal

[11] 4,389,821

[45] Jun. 28, 1983

[54] INFLATABLE DOCK SEAL

[76] Inventor: Larry O'Neal, 549 W. Indianola Ave., Youngstown, Ohio 44502

[21] Appl. No.: 282,926

[22] Filed: Jul. 13, 1981

[51] Int. Cl.³ .............................................. E06B 7/22
[52] U.S. Cl. .................................... 52/2; 52/173 DS
[58] Field of Search .................. 52/173 DS, 2; 160/72

[56] References Cited

U.S. PATENT DOCUMENTS

| 1,222,907 | 4/1917 | Truemper | 160/72 |
| 3,322,132 | 5/1967 | Rieder | 52/173 DS X |
| 3,391,502 | 7/1968 | O'Neal | 52/2 |
| 3,391,503 | 7/1968 | O'Neal | 52/2 |
| 3,461,627 | 8/1969 | Conger | 52/173 DS X |
| 3,714,745 | 2/1973 | O'Neal | 52/2 |
| 4,044,510 | 8/1977 | O'Neal | 52/2 |

Primary Examiner—John E. Murtagh
Assistant Examiner—Kathryn Ford
Attorney, Agent, or Firm—Harpman & Harpman

[57] ABSTRACT

An inflatable dock seal for closing the area defined by an opening such as a loading dock with respect to a truck or trailer includes a pair of vertical inflatable multiple sectioned members movable outwardly and towards one another in a curved configuration that will engage the sides of a truck or trailer and a upper generally horizontal inflatable member movable both outwardly and downwardly against the top of a truck or trailer. There are straps resiliently retracting the inflatable members when not inflated so as to provide a small relatively thin shape adjacent the dock opening.

3 Claims, 5 Drawing Figures

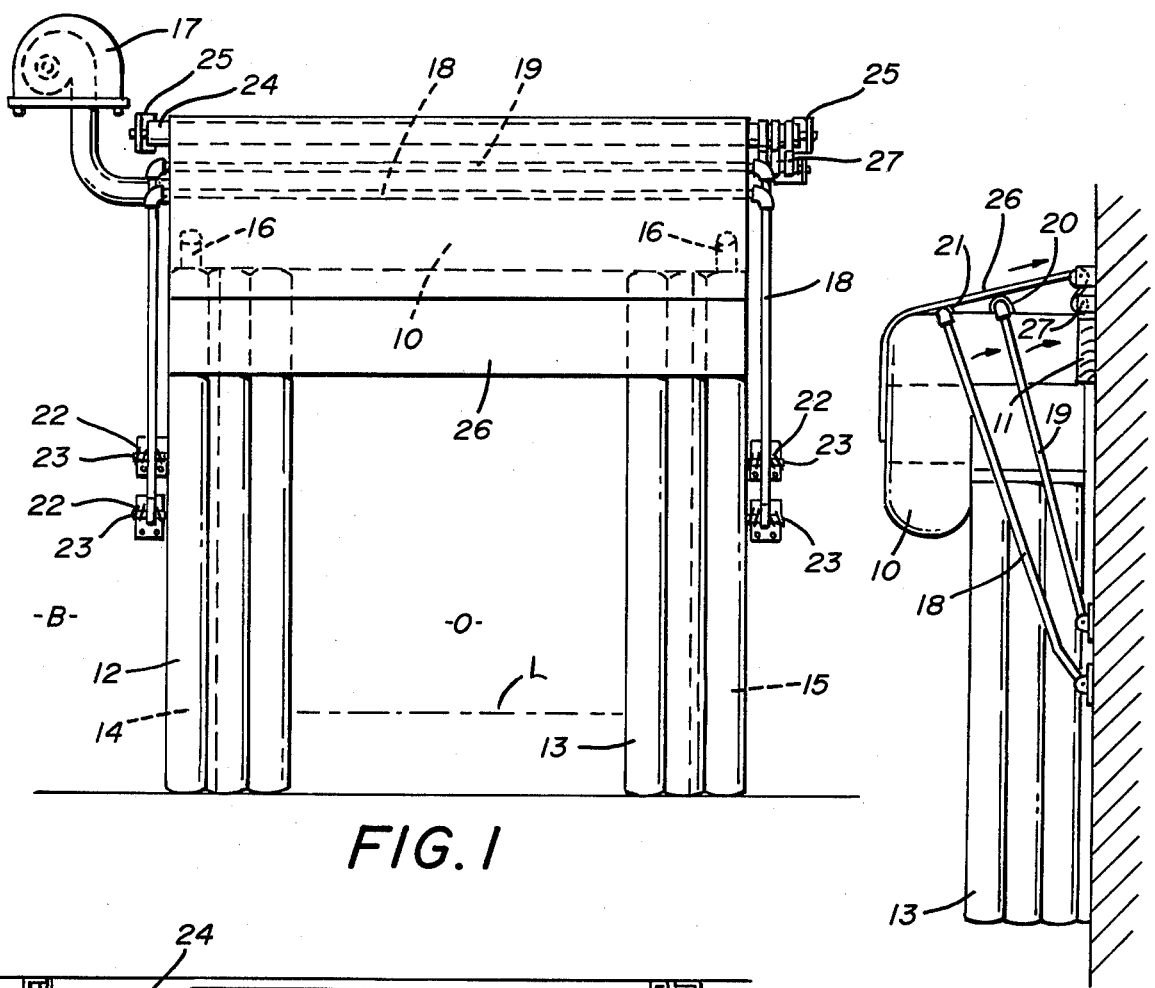
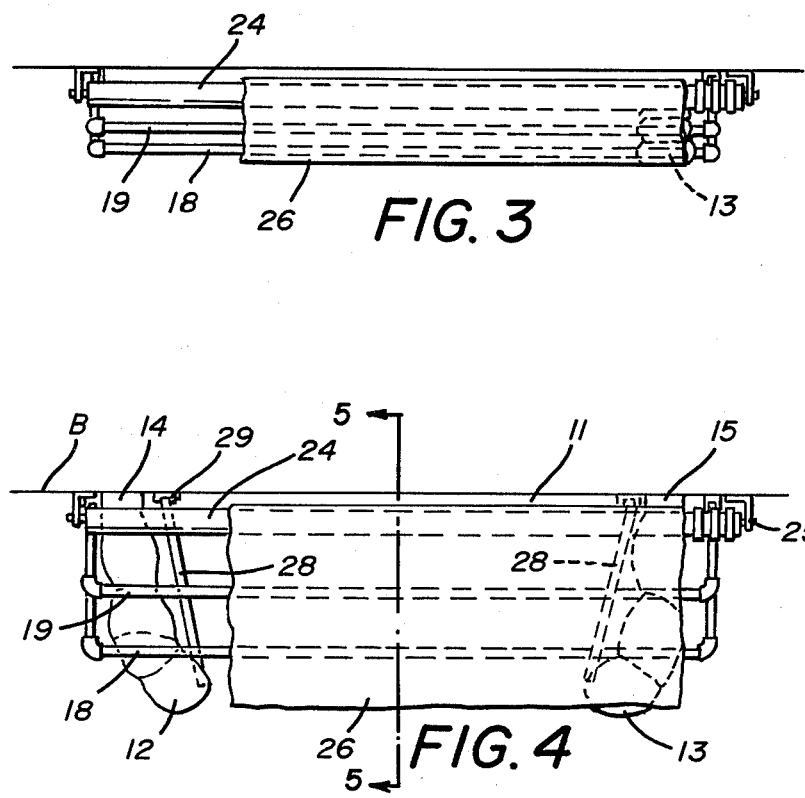

INFLATABLE DOCK SEAL

BACKGROUND OF THE INVENTION

This invention relates to inflatable dock seals for use on dock openings to close the same with respect to a truck or trailer positioned adjacent thereto.

DESCRIPTION OF THE PRIOR ART

Prior art devices of this type are generally mounted around an opening in a building against which a truck or trailer is positioned to form an extended closed passageway when inflated, see for example applicant's U.S. Pat. Nos. 3,391,502, 3,391,503, 3,714,745, 4,044,510, and others.

Applicant's new dock seal is an improvement in that it is completely flexible and can be retracted to a thin flat shape against the building. The dock seal of the present invention does not require a support frame that extends from the building and limits the height of truck or trailer positioned thereunder. The present dock seal cannot be damaged by truck or trailer backed there against.

SUMMARY OF THE INVENTION

An inflatable dock seal comprises inflatable members positioned around an opening in a building to seal a truck or trailer body there against. An upper generally horizontal inflatable member is formed to move outwardly and downwardly when inflated against the top of the truck or trailer so as to close the space between the truck or trailer and the building. Vertically standing inflatable members positioned on opposite sides of the opening in the building move, when inflated, towards one another forming arcuate shapes contacting the opposite sides of the truck or trailer. Resilient means are provided to retract the inflatable members when deflated so as to move them away from the opening into a compact shape that will not be damaged by a truck or trailer moving there against.

DESCRIPTION OF THE DRAWINGS

FIG. 1 is a plan view of the inflatable dock seal in inflated position.

FIG. 2 is a side elevational view of the dock seal of FIG. 1.

FIG. 3 is a top plan view with portions cut away showing the inflatable dock seal in deflated retracted position.

FIG. 4 is a top plan view with portions cut away showing the dock seal in extended position and FIG. 5 is a cross-section on lines 55 of FIG. 4.

DESCRIPTION OF THE PREFERRED EMBODIMENT

An inflatable dock seal is illustrated in FIGS. 1 and 2 of the drawings as comprising three inflatable sections arranged in an inverted U-shaped configuration and positioned on an exterior of a building B above and to the sides of an opening 0 therein, against which a truck or trailer is to be positioned. A horizontal inflatable member 10 is positioned transversely above the opening 0 of the building B and is secured to a mounting board 11 which is fastened to the building B. A pair of vertical inflatable members 12 and 13 are positioned on opposite sides of the opening 0 and are secured to a pair of mounting boards 14 and 15 which are fastened to the building B. The vertical inflatable members 12 and 13 communicate with the horizontal inflatable member 10 through openings 16 in their upper ends and are formed so as to assume an arcuate curving shape when inflated. A blower 17 is positioned on the building B adjacent the horizontal inflatable member 10 and communicates therewith. A pair of tubular support members 18 and 19 form inverted U-shaped configurations extending across the top of the horizontal inflatable member 10 within elongated open ended sleeves 20, 21, respectfully which are secured to the top of the horizontal inflatable member 10 as best seen in FIG. 5 of the drawings. The tubular support members 18 and 19 extend downwardly on either side of the vertical inflatable members 12 and 13. The ends of the tubular support members 18 and 19 are pivotally secured to the building B adjacent one another and provide support for the horizontal inflatable member 10 in both inflated and deflated modes. Springs 22 are secured to pivot pins 23 and engage the tubular support members 18 and 19 through which the pivot pins 23 pass. The springs 22 urge the tubular support members 18 and 19 towards the building B when the horizontal inflatable member 10 is deflated.

In FIGS. 1 and 2 of the drawings broken line representations of openings 16 may be seen to provide communication between the interior of the horizontal inflatable member 10 and the upper portions of the vertical inflatable members 12 and 13 respectfully. Those skilled in the art will observe that when the blower 14 is actuated air enters the horizontal inflatable member 10 and expands it, shapes it and moves it into sealing engagement with the top of a truck or trailer body T while at the same time extending the vertical inflatable members 12 and 13 causing them to inflate and move into arcuate configurations where they extend towards one another and engage the opposite sides of the truck or trailer body T.

Referring now to FIGS. 3 and 4 of the drawings an elongated roller 24 will be seen mounted on a pair of brackets 25 on the building B above the horizontal inflatable member 10. A retracting flap 26 of an air impervious material is wound around the roller 24 and extends therefrom to the vertical portion of the horizontal inflatable member 10. The roller 24 is spring activated by a constant velocity spring mechanism 27 as best seen in FIGS. 1 and 2 of the drawings. It is secured to the building B adjacent the end of the roller 24. As the horizontal member 10 is inflated the retraction flap 26 unwinds from the roller 24 and assumes a fully extended configuration as seen in FIGS. 1, 2 and 4 of the drawings. As the vertical inflatable members 12 and 13 are inflated a pair of retraction straps 28 as seen in FIG. 4 of the drawings which are secured to the outer portion of the vertical inflatable member 12 and 13 extend from take-up reels 29 which are mounted on the building B. When the dock seal is deflated the retraction flap 26 retracts pulling the horizontal inflatable member 10 into close vertical position against the building B. The vertical inflatable members 12 and 13 are pulled back against the building B by their respective retraction straps 28 as they are deflated. The spring urged tubular support arms 18 and 19 move upwardly to a vertical position helping retract and support the deflated horizontal inflatable member 10.

Referring now to FIG. 5 of the drawings a portion of the horizontal inflatable member 10 can be seen showing the multiple cell construction thereof wherein a bulkhead 30 having an opening 31 therein allows the air to communicate between the cells in the horizontal inflatable member 10 as best seen in FIG. 2 of the drawings. A pair of oppositely disposed cover members 32 are secured to the mounting boards 14 and 15 respectfully and to the adjacent sides of the horizontal inflatable member 10 respectfully covering the areas at which the horizontal inflatable member 10 and the vertical inflatable members 12 and 13 meet precluding the possibility of weather infiltrating between the inflatable members.

The dock seal configuration thus formed while generally self-supporting in inflatable condition requires the assistance of the spring urged tubular support arms 18 and 19 to prevent the assembly from sagging. This combination of tubular movable supports arms 18 and 19 and the flexible retraction flaps 26 provide a totally flexible surface both horizontally and vertically when retracted against the building B.

Referring to FIG. 5 of the drawings a weather shield 32 can be seen extending from the building B outwardly comprising an elongated semi-rigid rectangular body member having a hinge 33 securing it to the building B. This weather shield engages the retraction flap 26 along its upper surface, removing snow or debris from the flap 26 as it is retracted.

It will occur to those skilled in the art that a modified form of the device could be used on railroad cars wherein an additional horizontal inflatable member could be positioned between the lower ends of said inflatable members 12 and 13 indicated by a broken line L providing a complete seal around an opening in the railroad car, (not shown).

Having thus described my invention, what I claim is:

1. An inflatable dock seal for positioning on a building having an opening defined therein and comprising an inflatable inverted U-shaped device formed of flexible air impervious material and consisting of a horizontal inflatable member and a pair of vertical inflatable members in communication therewith, means for attaching said members to said building and means for inflating said members, means for supporting portions of the horizontal member when moved toward and away from the building by inflation and deflation, said means comprising spaced inverted U-shaped support members secured transversely to said horizontal member and pivotally secured to said building therebelow and means for retracting said horizontal member when deflated, said means for retracting said horizontal member when deflated comprising a retractable flap on said horizontal member, a spring driven roller on said building, said flap attached to said spring driven roller so that the same can be wound up thereon, said horizontal member having portions extending outwardly from said building and downwardly when inflated, said vertical inflatable members each consisting of an elongated hollow flexible member having a transversely arcuate configuration and secured at their opposite outer longitudinal edges to said building adjacent to said opening.

2. The inflatable dock seal set forth in claim 1 and wherein the horizontal inflatable member and said means for supporting portions of the horizontal inflatable member are arranged to move arcuately into a flat folded compact mass adjacent said building and above said opening therein.

3. An improvement in an inflatable dock seal for positioning on a building having an opening therein so as to form a self-adjusting closure around said opening with respect to a truck or trailer positioned adjacent thereto, the improvement comprising means for shaping and moving said inflatable dock seal toward and away from said building and said truck or trailer, said inflatable dock seal comprising the combination of a horizontal inflatable member arranged in a compact mass above said opening and secured to said building and a pair of vertical inflatable members each arranged in a compact mass at the sides of said opening, means establishing communication between said horizontal and vertical inflatable members and means for inflating the same, said horizontal inflatable member having a first section arranged to project outwardly from said building when inflated and a second section on said first section arranged to extend downwardly from said first section in spaced relation to said building when said sections are inflated, said vertical inflatable members arranged to project outwardly from said building and toward one another when inflated, said means for shaping and moving said inflatable dock seal toward and away from said building and said truck or trailer comprising at least one inverted U-shaped support member, a horizontal midsection thereof attached to said horizontal inflatable member so as to be movable from a first position adjacent said building when said horizontal inflatable member is deflated to a second position spaced with respect to said building when said horizontal inflatable member is inflated and spring means normally urging said support member and said horizontal inflatable member toward said building.

* * * * *